H. A. PETERSON.
BRUSH CUTTER AND STUMP REMOVER.
APPLICATION FILED JULY 15, 1918.

1,295,364.

Patented Feb. 25, 1919.

Inventor:
Henry A. Peterson,
by Fetherstonhaugh
Attys.

UNITED STATES PATENT OFFICE.

HENRY A. PETERSON, OF OHATON, ALBERTA, CANADA.

BRUSH-CUTTER AND STUMP-REMOVER.

1,295,364.　　　　　Specification of Letters Patent.　　Patented Feb. 25, 1919.

Application filed July 15, 1918. Serial No. 244,987.

*To all whom it may concern:*

Be it known that I, HENRY A. PETERSON, a subject of the King of Great Britain, and resident of the town of Ohaton, in the Province of Alberta, Dominion of Canada, have invented certain new and useful Improvements in Brush-Cutters and Stump-Removers, of which the following is a specification.

This invention relates to improvements in brush cutters and stump removers and the objects of the invention are to facilitate clearing land of roots, brush and the like, to render the device simple in construction by dispensing with the moving parts so reducing the liability of the cutter going out of order, and generally to adapt the cutter to better perform the functions required of it.

With the above and other objects in view, the invention consists essentially of the improved construction particularly described and set forth in the following specification and accompanying drawings forming part of the same.

In the drawings.

Like characters of reference refer to like parts in the several figures.

Figure 1:
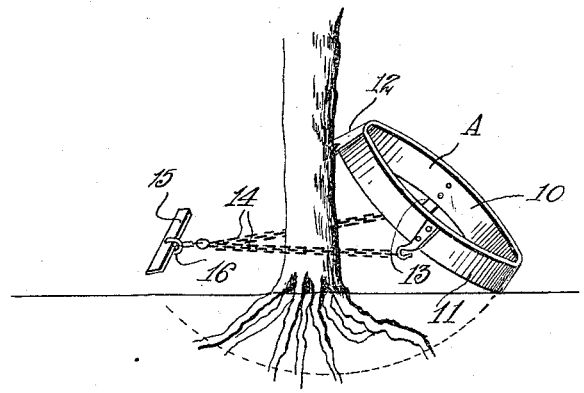
Figure 1 is a perspective view of the brush cutter in position prior to cutting the roots of a stump.
Figure 2:
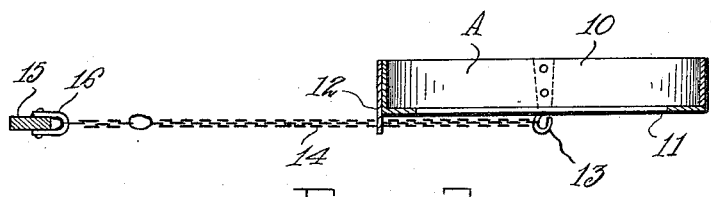
Fig. 2 is a longitudinal section of the improved brush cutter.
Figure 3:
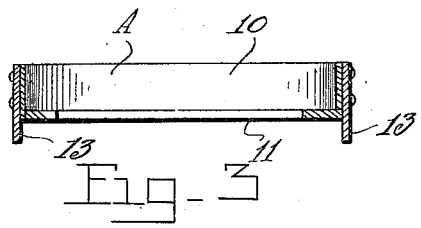
Fig. 3 is a transverse section of the same.

Referring to the drawings, A represents the improved brush cutter comprising a cylindrical body portion 10 provided with a lower cutting edge 11 and having a V-shaped prong 12 rigidly attached to the front of the said body.

The cutter is further provided with a pair of downwardly disposed hooks arranged diametrically opposite each other and at right angles to the axis passing through the prong 12 of the said body portion. Chains 14 are designed to be secured to the hooks 13 so that a pulling force may be applied to the same in a manner to be made clear hereafter.

In the embodiment illustrated, the chains 14 converge and are connected to a whiffletree or evener 15 by means of a shackle 16 and to this whiffletree or evener a convenient type of tractive or pulling force may be attached.

When the cutter is in use, it is placed in an angularly disposed position with the prong 12 engaging with or anchored against the stump and the rear cutting edge 11 about to penetrate the ground.

When a pull is applied to the whiffletree or evener 15 the body 10 rotates about the prong 12 so that the cutting edge 11 enters the ground and on engaging or coming into contact with the roots of the stump will cut through the same and so permit of the stump being removed.

From this description, it will be seen that I have invented a brush cutter which can be advantageously utilized in the clearing of land and in which the several parts are so arranged that they are not liable to become broken or go out of use, the simplicity of the device being such as would commend itself to farmers.

As many changes could be made in the above construction and many apparently widely different embodiments of my invention within the scope of the claims, constructed without departing from the spirit or scope thereof, it is intended that all matter contained in the accompanying drawings and specification shall be interpreted as illustrative and not in a limited sense.

What I claim as my invention is:

1. A brush cutter and stump remover of the class described, comprising a cylindrical body portion having a lower cutting edge, means for attaching the said body portion to a stump and means for applying a tractive force to the said cutter.

2. A brush cutter and stump remover of the class described, comprising a cylindrical body portion having a lower cutting edge, a peripheral prong on the body portion adapted to engage with a stump and means for applying a pull to the cutter whereby it is rotated about the prong, as and for the purpose specified.

3. A brush cutter and stump remover of the class described, comprising a cylindrical body portion, a peripheral prong on the body portion, a pair of hooks on the body portion, and a flexible pulling member connected to the hooks.

In witness whereof I have hereunto set my hand in the presence of two witnesses.

HENRY A. PETERSON.

Witnesses:
J. K. BURGESS,
W. MACCAY.

Copies of this patent may be obtained for five cents each, by addressing the "Commissioner of Patents, Washington, D. C."